United States Patent [19]
Vine

[11] Patent Number: 6,117,034
[45] Date of Patent: Sep. 12, 2000

[54] FLOATING FLEXIBLE DRIVE ELEMENT TENSIONER

[75] Inventor: Jeffrey A. Vine, Beaverton, Oreg.

[73] Assignee: Poly Hi Solidur, Fort Wayne, Ind.

[21] Appl. No.: 09/332,751

[22] Filed: Jun. 14, 1999

[51] Int. Cl.⁷ .................................................. F16H 7/08
[52] U.S. Cl. ........................................... 474/134; 474/135
[58] Field of Search .................................. 474/101, 132, 474/133, 134, 135

[56] References Cited

U.S. PATENT DOCUMENTS

| | | |
|---|---|---|
| D. 342,229 | 12/1993 | Ringle . |
| 716,520 | 12/1902 | Cole . |
| 976,115 | 11/1910 | Bard . |
| 1,338,405 | 4/1920 | Stickney . |
| 2,210,276 | 8/1940 | Bremer . |
| 2,639,623 | 5/1953 | Ausherman . |
| 2,963,918 | 12/1960 | Blakstad . |
| 3,069,920 | 12/1962 | Cole . |
| 3,115,046 | 12/1963 | Bliss et al. . |
| 3,148,555 | 9/1964 | Peras . |
| 3,172,650 | 3/1965 | Jarret et al. . |
| 3,295,383 | 1/1967 | Allen . |
| 3,370,476 | 2/1968 | Hill et al. . |
| 3,455,178 | 7/1969 | Ruoff et al. . |
| 3,514,144 | 5/1970 | Alderfer . |
| 3,575,058 | 4/1971 | Kraus . |
| 3,606,296 | 9/1971 | Chassagne . |
| 3,630,096 | 12/1971 | Brewer . |
| 3,673,884 | 7/1972 | Southier . |
| 3,811,332 | 5/1974 | Brown et al. . |
| 3,926,063 | 12/1975 | Mayfield . |
| 3,931,745 | 1/1976 | Dobberpuhl . |
| 3,933,055 | 1/1976 | Newhouse et al. . |
| 3,941,006 | 3/1976 | Brodesser . |
| 3,964,331 | 6/1976 | Oldfield . |
| 4,034,821 | 7/1977 | Stoddard et al. ........................ 474/101 |
| 4,068,535 | 1/1978 | Sheets . |
| 4,191,062 | 3/1980 | Gardner .................................. 474/101 |
| 4,530,681 | 7/1985 | Noboru et al. . |
| 4,615,096 | 10/1986 | Foster . |
| 4,662,862 | 5/1987 | Matson . |
| 4,798,562 | 1/1989 | Matson . |
| 4,850,934 | 7/1989 | Gibson et al. . |
| 5,000,724 | 3/1991 | Reid . |
| 5,295,918 | 3/1994 | Campbell et al. ....................... 474/101 |
| 5,344,300 | 9/1994 | Shapcott . |
| 5,779,582 | 7/1998 | Mott et al. . |
| 5,853,341 | 12/1998 | Wigsten . |

FOREIGN PATENT DOCUMENTS

353797  8/1931  United Kingdom .

*Primary Examiner*—Dirk Wright
*Attorney, Agent, or Firm*—Keith A. Cushing

[57] ABSTRACT

A floating chain tensioner includes a pair of opposing sprockets with at least one sprocket in slidable relation relative to the other. A pair of elastomer tensioning bands urges the slide-mounted sprocket towards the other sprocket. The floating chain tensioner captures a drive chain between the sprockets to establish tension therein. The tensioning sprockets enjoy some freedom of movement relative to one another while maintaining tension against the drive chain during operation of an associated chain-driven mechanism.

15 Claims, 5 Drawing Sheets

FLOATING FLEXIBLE DRIVE ELEMENT TENSIONER

BACKGROUND OF THE INVENTION

The present invention relates generally to chain-driven or to belt-driven mechanisms, and in particular to tensioning devices therefor.

A typical chain-driven mechanism includes a driver sprocket and a driven sprocket interconnected by a linked chain. The interconnecting chain desirably remains at a selected tension during operation. In some cases, the driver sprocket and driven sprocket remain at a fixed relative separation. In such cases, the length of the chain relative to the fixed separation between and the driver sprocket and driven sprocket establishes the desired chain tension. As the chain wears, however, tension diminishes and eventually becomes unacceptable. In other cases, spring biased tensioning devices attach to surrounding frames or structures of the chain-driven mechanism. Typically, such frame-mounted tensioning devices are part of the design of the mechanism as provided by the original manufacturer, i.e., as an integral and essential part of device operation. As the chain wears or becomes loose, such frame-mounted tensioning devices maintain the selected tension in the chain for ongoing reliable operation.

Unfortunately, not all chain-driven mechanisms come with a chain tensioner or have available surrounding frames or structures to support a spring-biased tensioning device. In many cases, the drive sprocket and driven sprocket are separated at fixed distance without any appropriate intervening structure. Chain tension is established only by careful selection of chain length in relation to fixed separation between the driven sprocket and driver sprockets. In such arrangements, chain wear eventually produces loss of chain tension. With no opportunity to reposition either one of the driver sprocket or driven sprocket, chain replacement is an expensive option. Where the driver sprocket and driven sprocket may be adjusted in position relative to one another, chain tension may be adjusted by virtue of such repositioning capability. Many times, however, such repositioning of the driver or driven sprocket is inconvenient or lacks the necessary range of adjustment needed to maintain sufficient chain tension.

Floating chain tensioners provide a mechanism maintaining tension in a chain-driven system without requiring attachments to any surrounding structures or re-positioning of the sprockets. Accordingly, floating chain tensioners find great utility in machines with no surrounding supporting frame suitable for mounting a tensioning device; in machines in which the original manufacturer did not provide a tensioning mechanism; and in cases where the user is simply unwilling to go to the expense or trouble of mounting some form of tensioning device relative to surrounding frame work. The floating tensioning device provides a quick and ready solution in the above-noted situations and in other situations where chain tension is required in a chain-driven system.

Floating chain tensioners typically include a pair of chain-engaging members, e.g., slide blocks or sprockets, maintained at a selected fixed distance during operation and bearing against the chain to establish chain tension. More particularly, such chain-engaging members typically bear against the upward-facing portion of an upper section of chain and a downward-facing portion of a lower section of chain to force the chain into an "hour-glass" shape. Some chain tensioners provide adjustment in relative position between the chain-engaging members, but during operation maintain such chain-engaging members at fixed separation. Accordingly, as the chain wears, the chain tensioner eventually cannot maintain tension and frequent adjustments, i.e., in relative position between the chain-engaging members, are necessary. Furthermore, such chain tensioning devices with chain-engaging members at fixed separation cannot continuously maintain the desired chain tension through the dynamic conditions of machine operation. The chain is never maintained in control at the necessary tension and the chain and floating chain tensioner tend to jump about significantly during operation. Because such chain tensioners, i.e., chain tensioners with fixed separation between chain-engaging members, cannot maintain optimum chain tension through dynamic operating conditions, such chain tensioners cannot satisfactorily maintain chain tension for all conditions, e.g., during start-up, normal operation, light loading, heavy loading, slow down, or stop conditions.

U.S. Pat. No. 5,000,724 issued Mar. 19, 1991 and entitled Roller Chain Tensioning Device shows a floating chain tensioning device including a pair of low friction chain-engaging blocks held at a selected distance and against a roller chain by means of a strap and fastener device. The strap loops through the chain-engaging blocks and pulls the blocks together to capture the roller chain therebetween and establish tension therein. Once tightened by means of the strap and fastener device, the woven nylon straps maintain the chain-engaging blocks at a selected distance apart to induce a selected tension in the roller chain.

U.S. Pat. No. 4,798,562 issued Jan. 17, 1999 and entitled Tensioning Device for Flexible Drive Element illustrates a similar floating chain tensioner with brackets maintaining chain-engaging blocks at a selected distance to bear against a chain therebetween and establish tension therein. While the device allows selected separation, i.e., adjustment, between the chain-engaging blocks, the blocks remain at a fixed relative distance during machine operation. U.S. Pat. No. 4,662,862 issued May 5, 1987 and entitled Tensioning Device for a Flexible Drive Element shows a similar floating chain tensioning device employing a ratchet mechanism, but during operation maintaining a fixed distance between the chain-engaging blocks. U.S. Pat. No. 4,850,934 issued Jul. 25, 1999 and entitled Stabilized Tensioning Device for Flexible Drive Element also shows a floating tensioning device having adjustable separation between chain-engaging blocks but fixed separation during operation thereof.

U.S. Pat. No. 3,630,096 issued Dec. 28, 1971 and entitled Drive-Tensioning Apparatus discloses a device including a pair of rotatable sprockets carried upon a floating arm and maintained at fixed distance therebetween. The floating arm slides within a frame-mounted bracket. During operation, the floating arm moves in response to chain tensioning conditions, but the sprockets remain at all times at a fixed distance therebetween.

U.S. Pat. No. 1,338,405 issued Apr. 27, 1920 and entitled Belt Tightener shows a pair of pulleys mounted rotatably upon a pair of supporting brackets adjustable in length to establish a selected distance between the pulleys for capturing a belt therebetween and establishing tension therein.

U.S. Pat. No. 3,941,006 issued Mar. 2, 1976 and entitled Free Floating Belt Tensioner illustrates a pair of pulleys rotatably mounted upon a Z-shaped bar including length adjustment therealong to establish a selected separation between the pulleys and capture a belt therebetween.

U.S. Pat. No. 3,926,063 issued Dec. 16, 1975 and entitled Floating Idler Pulley Apparatus shows a belt tensioning device including a pair of pulleys bearing against and capturing a belt therebetween to establish tension therein. The tensioning pulleys are adjustable in position, but during operation remain at a fixed distance therebetween. While adjustment in position is contemplated during operation, such adjustment must be done manually and absent such adjustment the pulleys remain at fixed separation during normal operation of the device.

Thus, floating tensioners find use in a variety of applications, especially when the drive and driven sprockets are in fixed positions relative to one another, when one wishes to extend the life of a wearing chain by maintaining tension therein, and anytime one wishes to avoid the trouble and expense of establishing a mounting site for a frame-mounted tensioning device especially in a mechanism where the original manufacturer did not provide such tensioning device. The subject matter of the present invention addresses these issues by improving floating tensioners.

SUMMARY OF THE INVENTION

A floating tensioner under the present invention includes a pair of drive element-engaging members maintained in slidable relative relation and a biasing device urging together said drive element-engaging members. In operation, the floating tensioner under the present invention constantly bears against a flexible drive element by virtue of the biasing device and enjoys relative movement between drive element-engaging members during operation. The floating tensioner of the present invention thereby allows dynamic adaptation to operating conditions and to ongoing wear conditions of the flexible drive element over time.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention applies to "floating tensioners." As used herein, the term "floating tensioner" refers to a tensioning device depending entirely from a flexible drive element and inducing tension therein. Floating tensioners find particular utility as a quick and easy solution to maintaining chain or belt tension where the chain-driven or belt-driven mechanism has no integral, i.e., as manufactured, tensioning device. Floating tensioners also provide a quick solution to an excessively worn chain or belt without requiring a user to mount a tensioning device and especially where no surrounding frame or similar structure is available to mount a tensioning device in the vicinity of the chain. Accordingly, floating tensioners are primarily an after-market product added to chain-driven mechanisms by a user to maintain drive element, i.e., chain or belt, tension without requiring modification to the mechanism other than to capture a chain or belt between the chain-engaging or belt-engaging members of the floating tensioner.

While illustrated in the context of a chain-driven mechanism, the subject matter of the present invention applies also to other flexible drive elements such as flexible belts in belt-driven mechanisms including pulleys interconnected via the flexible drive belt. The following description will focus directly upon chain-driven mechanisms and linked chains as flexible drive elements coupling a driver and a driven sprocket. It should be apparent, however, that the following disclosure will support application of the present invention also to belt-driven mechanisms employing a belt as a flexible drive element and pulleys as the drive and the driven elements.

Figure 1:
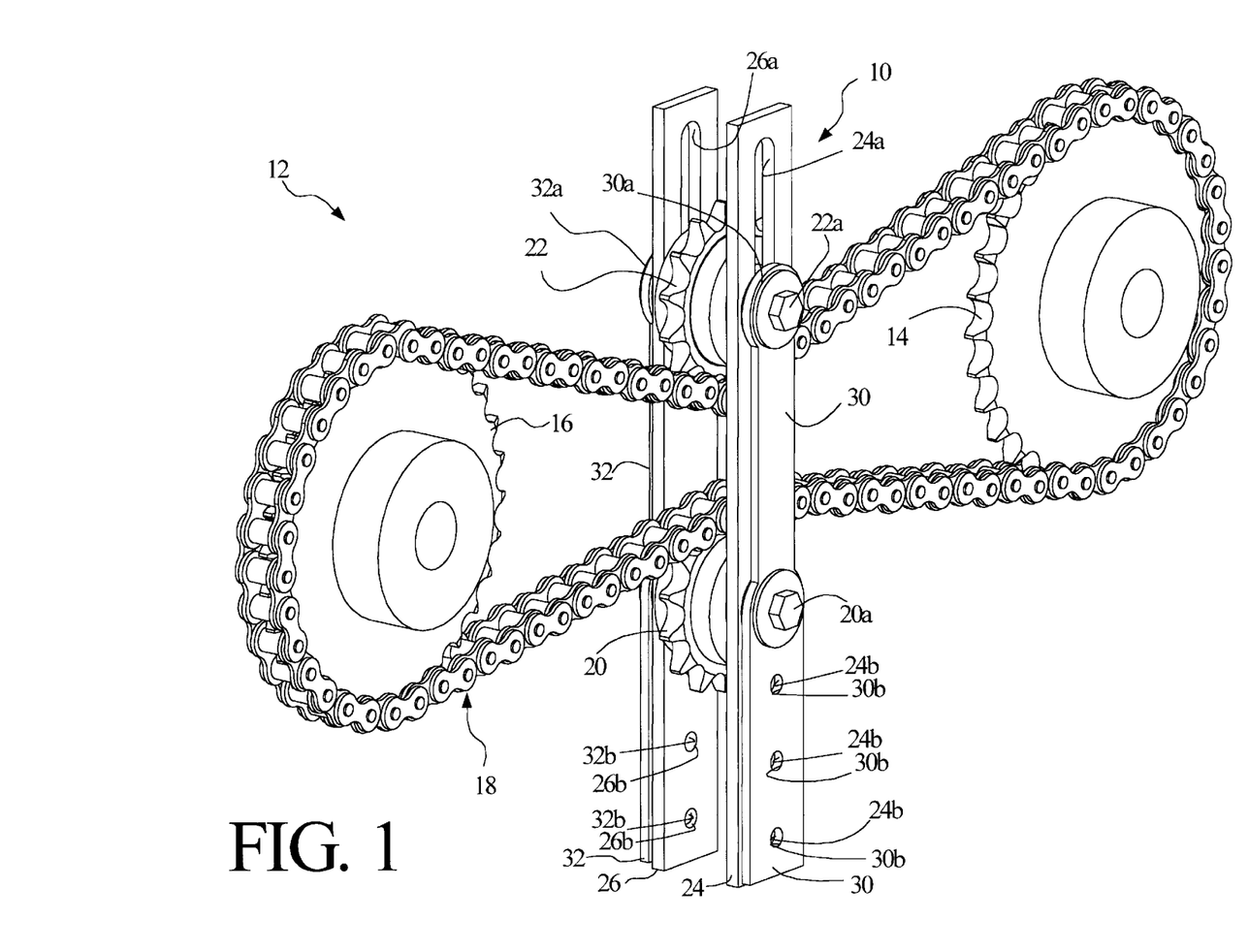
FIG. 1 illustrates in perspective a floating chain tensioner according to a preferred embodiment of the present invention as used in a chain-driven mechanism.

FIG. 1 illustrates a floating chain tensioner 10 according to a preferred embodiment of the present invention in the context of a chain-driven mechanism 12. Chain-driven mechanism 12 includes a driver sprocket 14 and a driven sprocket 16 interconnected by way of a drive chain 18. While not specifically illustrated herein, it will be understood that driver sprocket 14 couples to a driving device, e.g., applying rotational force thereto, and chain 18 transmits this rotational force to driven sprocket 16. In the present illustration, drive chain 18 is a linked flexible metal chain. Floating chain tensioner 10 depends entirely from chain 18 and provides appropriate tension in chain 18 during operation thereof.

Floating chain tensioner 10 includes free-rotating tensioning sprockets 20 and 22 each bearing toward the other and together against the outward-facing, i.e., most-upward and most-downward, portions of chain 18. Floating chain tensioner 10 rides intermediate the driver sprocket 14 and driven sprocket 16 whereby drive chain 18 assumes an "hour glass" shape as the tensioning sprockets 20 and 22 bear inward against chain 18 and induce tension therein. As described more fully hereafter, tensioning sprockets 20 and 22 enjoy a range of freedom of movement relative to one another while continuously applying tension to chain 18 during operation of mechanism 12.

Figure 2:
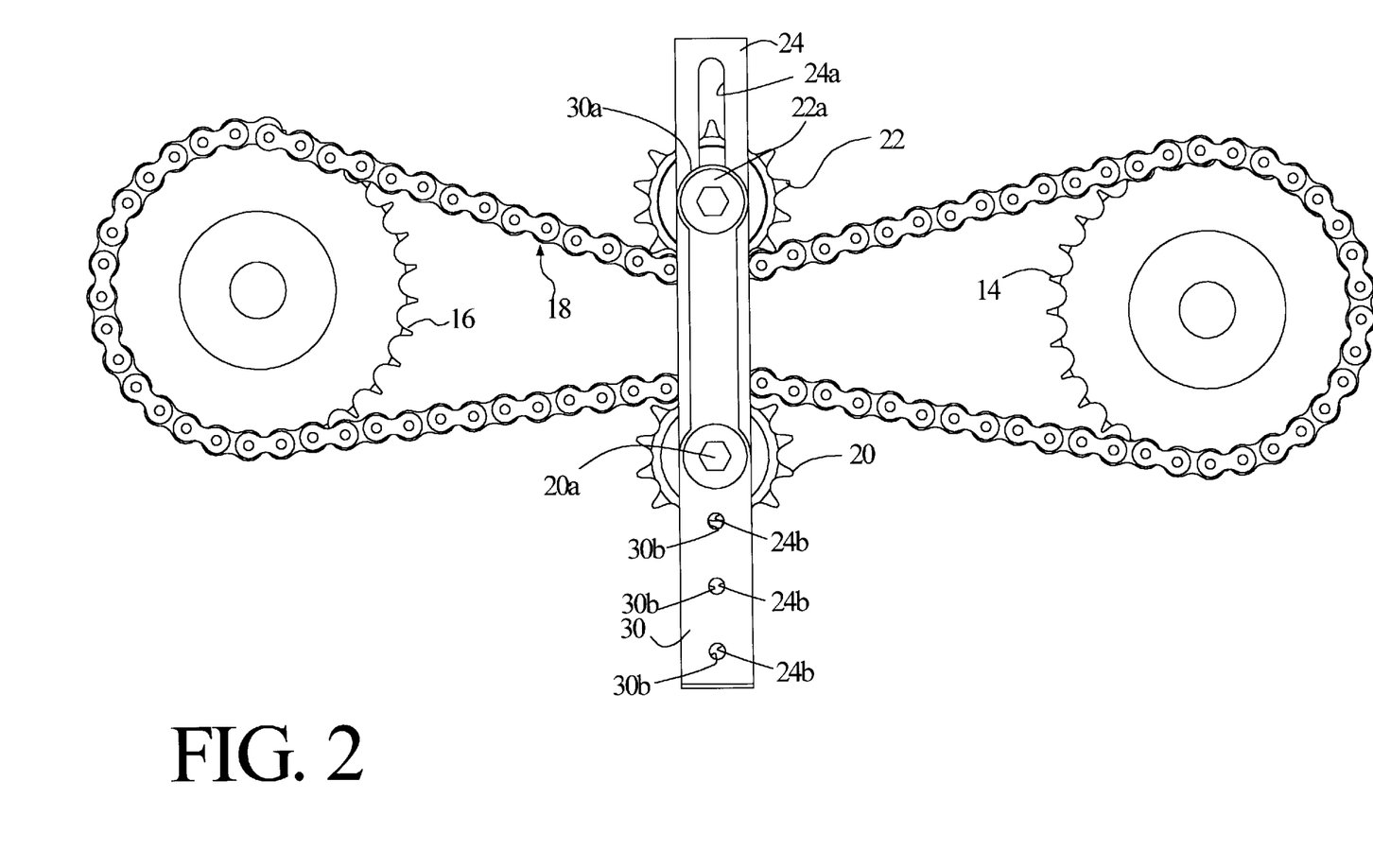
FIG. 2 is a side view of the floating chain tensioner of FIG. 1.
Figure 3:
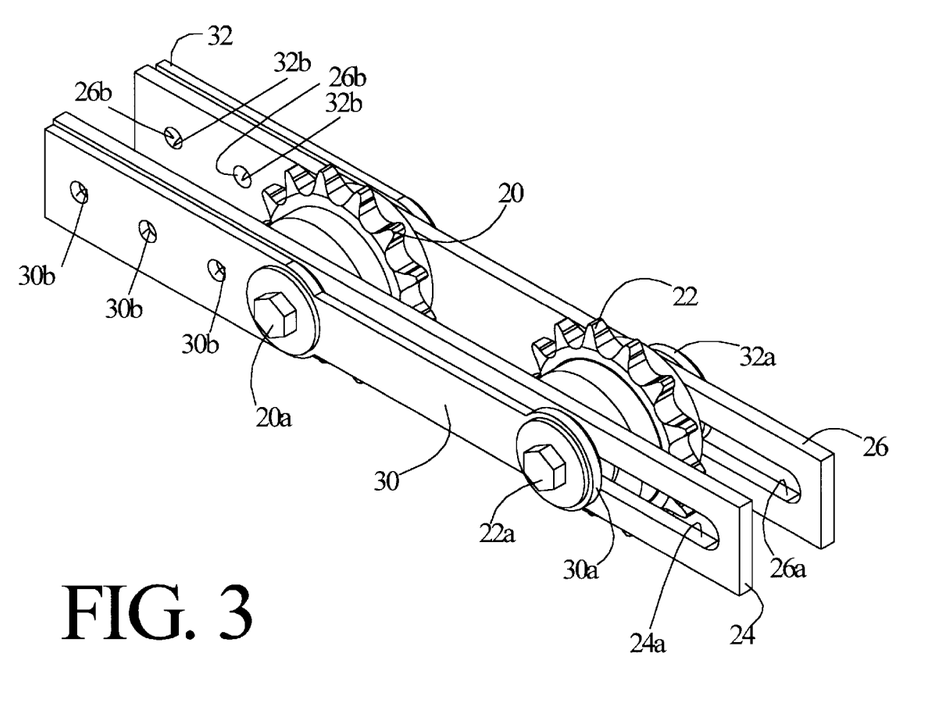
FIG. 3 illustrates the floating chain tensioner of FIG. 1 separate from the chain-driven mechanism.

With reference now to FIGS. 1–3, floating chain tensioner 10 includes a pair of support brackets 24 and 26. Bracket 24 includes a slot formation 24a and bracket 26 includes a slot formation 26a. Slot formations 24a and 26a are in corresponding locations on brackets 24 and 26, respectively, and provide a slide-mounting arrangement for tensioning sprocket 22. Each of brackets 24 and 26 also include a series of sprocket mounting apertures for selected mounting of sprocket 20 relative to brackets 24 and 26. The sprocket mounting apertures 24b of bracket 24 align with sprocket mounting apertures 26b of bracket 26. This establishes a plurality of discrete selectable mounting sites for sprocket 20 along brackets 24 and 26. Sprocket 20 rests rotatably upon its axle 20a and sprocket 22 rests rotatably upon its axle 22a. Thus, sprocket 20 may be positioned at a selected location according to mounting apertures 24b and 26b. Tensioning sprocket 22, however, enjoys freedom of movement relative to tensioning sprocket 20 by virtue of axle 22a resting slidably within slots 24a and 26a. In other words, tensioning sprocket 20 mounts rotatably in fixed position relative to brackets 24 and 26 and tensioning sprocket 22 mounts rotatably but in slidable relation relative to brackets 24 and 26.

Elastomer bands 30 and 32 lie along the outside surfaces of brackets 24 and 26, respectively. Elastomer bands 30 and 32 each couple together axles 20a and 22a of tensioning sprockets 20 and 22. The distal end 30a of band 30 and the distal end 32a of band 32 each include a mounting aperture receiving corresponding ends of axle 22a. Along the other end portion of each of bands 30 and 32, a set of sprocket mounting apertures correspond to the mounting apertures of the associated bracket. Thus, band 30 carries a series of sprocket mounting apertures 30b aligned with mounting apertures 24b of mounting bracket 24. Similarly, band 32 includes a series of mounting apertures 32b aligned with mounting apertures 26b of bracket 26. Thus, tensioning sprocket 20 mounts along a selected set of aligned mounting apertures while concurrently coupling its axle 20a to bands 30 and 32.

Those length portions of bands 30 and 32 captured between axles 20a and 22a, and when under tension as is contemplated under the present invention, urge axle 22a within slot formations 24a and 26a toward tensioning sprocket 20. To the extent that dynamic tension in chain 18 urges tensioning sprocket 22 in an opposite direction, tensioning bands 30 and 32 adapt dynamically to maintain tension in chain 18 while allowing movement of sprocket 22 relative to sprocket 20. Such dynamic adaptation in relative distance between sprockets 20 and 22 reduces operational stress on chain 18 and maintains more constant chain tensioning pressure as compared to conventional floating chain tensioning devices with chain-engaging members held at fixed separation during operation.

Figure 4:
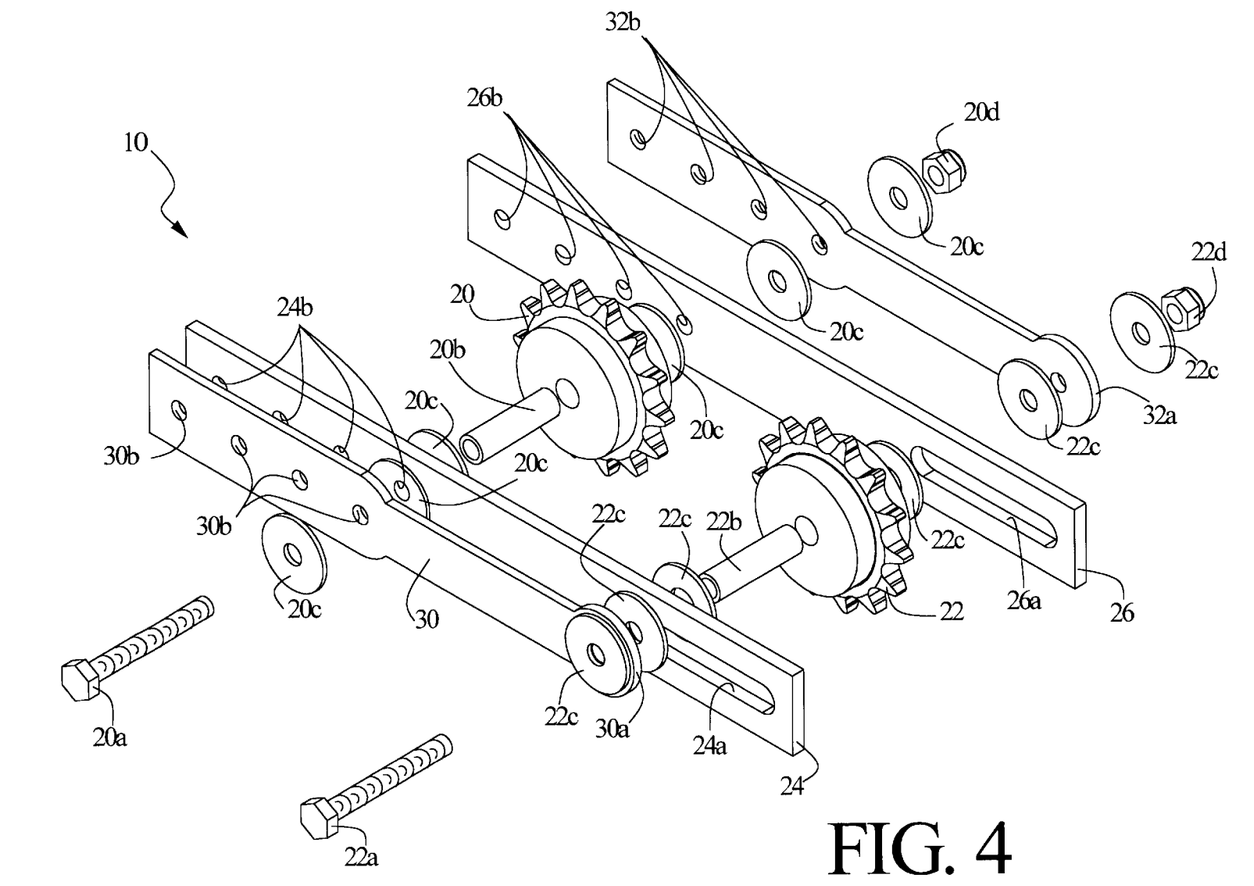
FIG. 4 illustrates the floating chain tensioner of FIG. 2 in an exploded perspective view.

FIG. 4 illustrates in exploded assembly view the floating chain tensioner 10 of FIGS. 1–3. In FIG. 4, sprocket 22 rests upon a cylindrical bushing 22b. A series of washers 22c provide interface between the various components of tensioner 10 in supporting and establishing the freely-rotatable sprocket 22 upon axle 22a. More particularly, axle 22a, provided herein as a threaded bolt 22a, passes through a first washer 22c, through the distal end 30a of band 30, through a second washer 22c, through slot 24a of bracket 24, through a next washer 22c, through the cylindrical bushing 22b, through another washer 22c on the opposite side of sprocket 22, through slot 26a of bracket 26, through a next washer 22c, through the distal end 32a of band 32, through a final washer 22c and engages a threaded bolt 22d. Thus, the assembly of sprocket 22a, axle 22a, bushing 22b, washers 22c, and nut 22d captures sprocket 22 rotatably between brackets 24 and 26 allowing sliding movement of sprocket 22 within slots 24a and 26a and allows bands 30 and 32 to urge sprocket 22 toward sprocket 20.

A similar mounting arrangement for sprocket 20 includes a cylindrical bushing 20b, a series of washers 20c, and a threaded nut 20d. Axle 20a, i.e., a threaded bolt 20a, passes through a first washer 20c, through a selected one of apertures 30b, through a next washer 20c, through a corresponding aperture 24b, through bushing 20b, through another washer 20c, through sprocket 20, through a washer 20c on the opposite side of sprocket 20, through a corresponding one of apertures 26b, through a next washer 20c, through a corresponding one of apertures 32b, through a final washer 20c and engages threadably nut 20d. In this manner, sprocket 20 mounts rotatably relative to brackets 24 and 26 at a selected location according to the selected ones of apertures 30b, 24b, 26b, and 32b.

Thus, by assembling chain tensioner 10 as described and tightening together bolt 20a with nut 20d and bolt 22a with nut 22d, chain tensioner 10 assumes the configuration as illustrated in FIGS. 1–3 with sprocket 20 mounted rotatably at a fixed location relative to brackets 24 and 26 and with sprocket 22 mounted rotatably relative to brackets 24 and 26 but enjoying freedom of movement toward and away from sprocket 20 by virtue of its slide-mounting within slots 24a and 26a. Furthermore, bands 30 and 32 urge together sprockets 20 and 22 to provide an ongoing biasing force therebetween while allowing some movement therebetween.

Chain tensioner 10 accommodates constant tensioning through a broader range of chain wear than possible in any tensioning device with fixed separation between chain-engaging blocks or sprockets, i.e., any fixed separation system requires more frequent repositioning of sprockets or blocks as compared to the frequency of repositioning or adjustment required under the floating chain tensioning device 10 of the present invention.

Figure 5:
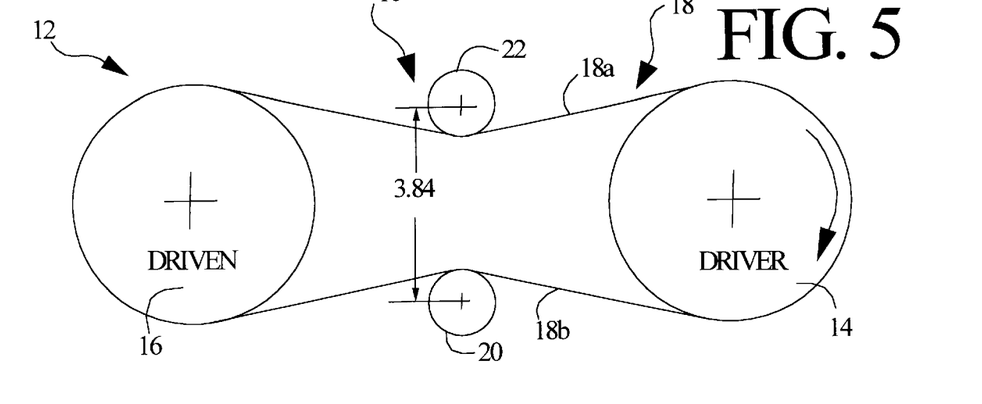
FIG. 5 illustrates schematically the chain tensioner and chain-driven mechanism of FIGS. 1 and 2 at rest or running with a very light load.
Figure 6:
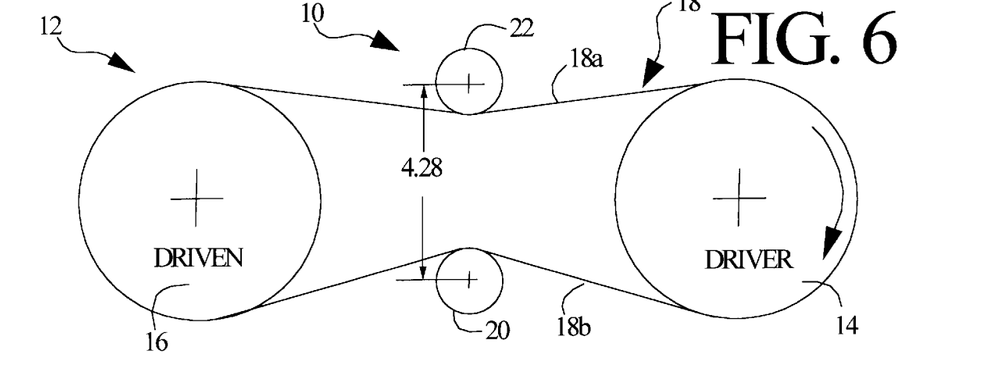
FIG. 6 illustrates schematically the chain tensioner and chain-driven mechanism of FIGS. 1 and 2 running with a medium load.
Figure 7:
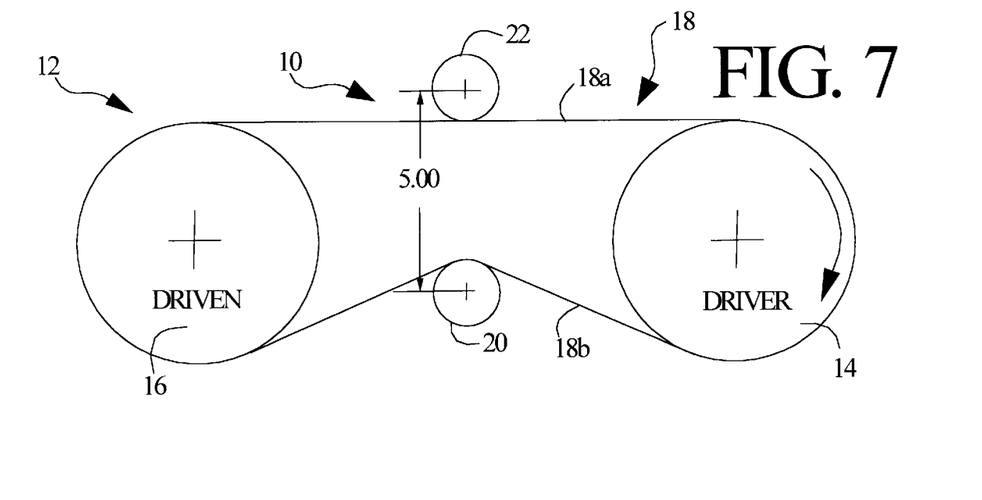
FIG. 7 illustrates schematically the chain tensioner and chain-driven mechanism of FIGS. 1 and 2 running with a heavy load.

FIGS. 5–7 illustrate schematically operation of the chain-driven mechanism 12 and chain tensioner 10. In the schematic illustration of FIGS. 5–7, however, only sprockets 20 and 22 of chain tensioner 10 and the relative separation therebetween are illustrated. In each of FIGS. 5–7, driver sprocket 14 is forced into clockwise, in the view of FIGS. 5–7, rotation. Chain 18 couples this rotational force to driven sprocket 16.

FIG. 5 illustrates chain-driven mechanism 12 at rest or under a very light load condition. When at rest or under a very light load condition, elastomer bands 30 and 32 of chain tensioner 10 (not shown in FIGS. 5–7) are fully contracted. As may be appreciated, under such rest or very light load conditions, elastomer bands 30 and 32 bring together sprockets 20 and 22 to their closest operating positions. The separation between corresponding points, i.e., axis of rotation, of sprockets 20 and 22 is approximately 3.84 inches under such conditions. Accordingly, tension in the upper section 18a of chain 18 is substantially equal to the tension in the lower portion 18b of chain 18. Chain tensioner 10 thereby urges chain 18 into a fairly symmetric hourglass shape with sprockets 20 and 22 urged to their closest relative positions by virtue of elastomer bands 30 and 32.

FIG. 6 illustrates operation of chain-driven mechanism 12 under a medium load condition with the upper section 18a of chain 18 carrying greater tension in comparison to the lower portion 18b of chain 18. In other words, section 18a of chain 18 as pulled rightward by driver sprocket 14 undergoes greater tension as it applies force to the driven sprocket 16 via section 18a. As section 18a undergoes greater tension, section 18a urges sprocket 22 away from sprocket 20. In the illustrated example, corresponding portions, i.e., axis of rotation, of sprockets 20 and 22 separate to approximately 4.28 inches. Fortunately, chain tensioner 10 accommodates such relative movement between sprockets 20 and 22 by virtue of slots 24a and 26a. Furthermore, elastomer bands 30 and 32 maintain an opposing and dynamic force urging sprockets 20 and 22 together. As a result, chain tensioner 10 accommodates the necessary relative movement between sprockets 20 and 22 while maintaining tensioning pressure against upper section 18a and lower section 18b to induce and maintain appropriate tension in chain 18 during such load conditions.

FIG. 7 illustrates operation of chain-driven mechanism 12 under a heavy load condition. Similar to the case of FIG. 6 but in more extreme magnitude, upper section 18a of chain 18 undergoes large magnitude tension bringing it into a virtually straight condition maximizing separation between sprockets 20 and 22. In this example, corresponding portions, i.e., axis of rotation, of sprockets 20 and 22 separate to approximately five inches. Despite such separation in response to heavy load conditions of chain-driven mechanism 12, however, chain tensioner 10 allows relative separation while, by virtue of elastomer bands 30 and 32, maintaining tension in chain 18 throughout sections 18a and 18b.

In conventional floating chain tensioners, i.e., where chain-engaging members remain at fixed relative distance, no such accommodation in dynamic operational conditions is possible. Chain tension cannot be maintained at optimum or near optimum conditions with a fixed separation between chain engaging members. As the mechanism undergoes various load conditions, there is no optimum separation for the chain engaging members suitable across all load conditions. For example, if the sprockets of a conventional floating chain tensioner were set at five inches from one another, the chain-driven mechanism would contain excess chain slack during a medium load or a light load condition. Conversely, if the sprockets of a conventional floating chain tensioner were set at 3.84 inches apart, the chain tension would become unnecessarily great during periods of heavy load transmission, possibly damaging the chain tensioner or the chain itself. Thus, fixed separation between chain engaging members in conventional floating chain tensioners necessarily requires compromise in optimum chain tension.

Accordingly, all floating chain tensioners with fixed separation between chain engaging embers must compromise tensioning conditions when selecting the fixed separation therebetween. Under the present invention, however, movement between chain engaging members while maintaining a biasing force therebetween accommodates varying load conditions while maintaining a desired chain tension.

Thus, an improved floating chain tensioner has been shown and described. The floating chain tensioner of the present invention may be used in a variety of applications, especially in after-market applications where one wishes to maintain tension in a worn chain without requiring mounting of a chain tensioning device relative to a surrounding frame structure. The chain-tensioner of the present invention adapts dynamically to a variety of load conditions to accommodate relative movement between chain-engaging members while also urging together such chain-engaging members to maintain tension in the chain-driven mechanism. Overall, the mechanism operates more smoothly with less risk of damage to the floating chain tensioner or to the chain.

It will be appreciated that the present invention is not restricted to the particular embodiment that has been described and illustrated, and that variations may be made therein without departing from the scope of the invention as found in the appended claims and equivalents thereof.

What is claimed is:

1. A floating tensioner comprising:
   a first engaging member;
   a second engaging member, at least one of said first and second engaging members being movable toward and away from the other one of said first and second engaging members within a given range of movement; and
   a biasing element urging together said first and second engaging members through said given range.

2. A floating tensioner according to claim 1 wherein said first and second engaging members are chain-engaging rotatable sprockets.

3. A floating tensioner according to claim 1 wherein said at least one of said first and second engaging members mounts slidably within a slot formation of said floating tensioner.

4. A floating tensioner according to claim 1 wherein said biasing element includes at least one elastomer band coupling said first and second engaging members.

5. A floating tensioner according to claim 1 wherein said floating tensioner further comprises:
   first and second brackets in spaced face-to-face relation and each including corresponding slot formations, said slot formations receiving said at least one engaging member and allowing said movement of said at least one engaging member within said given range.

6. A floating tensioner according to claim 5 wherein said first and second brackets further each include a series of mounting apertures, each series of mounting apertures for one of said first and second brackets corresponding in position to said series of mounting apertures of the other one of said first and second mounting brackets, said other one of said engaging members being mountable relative to a pair of corresponding mounting apertures selected from each series of mounting apertures.

7. In a floating tensioner including first and second drive element engaging members bearing against a flexible drive element to induce tension therein, an improvement comprising:
   a mounting arrangement for at least one of said first and second engaging members allowing movement toward and away from the other one of said first and second engaging members; and
   a biasing element urging together said first and second engaging elements.

8. An improvement according to claim 7 wherein said engaging members are rotatable relative to a bracket structure of said floating tensioner.

9. An improvement according to claim 7 wherein said biasing element comprises at least one elastomer band coupling together said first and second engaging members.

10. An improvement according to claim 7 wherein said mounting arrangement comprises a pair of brackets each including a slot formation receiving said at least one of said first and second engaging members slidably therein.

11. An improvement according to claim 7 wherein said flexible drive element is a linked chain and said drive element engaging members are sprockets adapted for engaging said linked chain.

12. An improvement according to claim 7 wherein said floating tensioner further comprises:
   first and second brackets in spaced face-to-face relation and each including corresponding slot formations, said slot formations receiving said at least one of said first and second engaging members thereby establishing said allowed movement toward and away from the other one of said first and second engaging members within a given range.

13. An improvement according to claim 12 wherein said first and second brackets further each include a series of mounting apertures, each series of mounting apertures for one of said first and second brackets corresponding in position to the series of mounting apertures of the other one of said first and second mounting brackets, said other one of said engaging members being mountable relative to a pair of corresponding mounting apertures from each series of mounting apertures.

14. A floating tensioner comprising:

a first bracket including a first series of mounting apertures and a first slot formation;

a second bracket including a second series of mounting apertures and a second slot formation, said first series of mounting apertures corresponding in location to said second series of mounting apertures and said first slot formation corresponding in position to said second slot formation when said first and second brackets are located in face-to-face spaced relation;

a first elastomer band including a third series of mounting apertures corresponding to said first and second series of mounting apertures and including a distal mounting aperture;

a second elastomer band including a fourth series of mounting apertures corresponding to said first, second, and third series of mounting apertures and including a distal mounting aperture;

a first drive element engaging member mounted relative to a selected member of each of said first, second, third, and fourth series of mounting apertures intermediate said first and second brackets and intermediate said first and second elastomer bands; and a second drive element engaging member mounted relative to said first and second distal mounting aperture of said first and second elastomer bands and mounted relative to said first and second slot formations whereby said first and second sprockets enjoy relative movement therebetween while urged together by virtue of said first and second elastomer bands.

15. A tensioning device according to claim 14 wherein said engaging members are sprockets rotatably mounted relative to said first and second brackets and relative to said first and second elastomer bands.

* * * * *